US012682618B2

(12) United States Patent
Hong et al.

(10) Patent No.: US 12,682,618 B2
(45) Date of Patent: Jul. 14, 2026

(54) KNOWLEDGE DISTILLATION METHOD FOR COMPRESSING IMAGE SEGMENTATION MODEL AND COMPUTING DEVICE FOR PERFORMING THE SAME

(71) Applicant: University-Industry Cooperation Group of Kyung Hee University, Gyeonggi-do (KR)

(72) Inventors: Choong Seon Hong, Gyeonggi-do (KR); Chaoning Zhang, Gyeonggi-do (KR); Dong Shen Han, Gyeonggi-do (KR); Seung Kyu Lee, Gyeonggi-do (KR); Sung Ho Bae, Gyeonggi-do (KR); Jung Uk Kim, Gyeonggi-do (KR); Yu Qiao, Gyeonggi-do (KR)

(73) Assignee: University-Industry Cooperation Group of Kyung Hee University, Gyeonggi-do (KR)

( * ) Notice: Subject to any disclaimer, the term of this patent is extended or adjusted under 35 U.S.C. 154(b) by 271 days.

(21) Appl. No.: 18/612,087

(22) Filed: Mar. 21, 2024

(65) Prior Publication Data

US 2025/0139944 A1     May 1, 2025

(30) Foreign Application Priority Data

Oct. 26, 2023     (KR) ........................ 10-2023-0145114

(51) Int. Cl.
*G06V 10/774* (2022.01)
*G06N 3/096* (2023.01)
(Continued)

(52) U.S. Cl.
CPC ........... *G06V 10/774* (2022.01); *G06N 3/096* (2023.01); *G06V 10/776* (2022.01); *G06V 10/26* (2022.01)

(58) Field of Classification Search
CPC .... G06V 10/774; G06V 10/776; G06V 10/26; G06N 3/096; G06N 3/0495; G06N 3/0455; G06T 7/10; G06T 2207/20084
See application file for complete search history.

(56) References Cited

U.S. PATENT DOCUMENTS

2023/0118361 A1* 4/2023 Liba ......................... G06T 3/40
2024/0386280 A1* 11/2024 Zhao ................... G06N 3/0455

FOREIGN PATENT DOCUMENTS

KR     10-2022-0160814 A     12/2022

OTHER PUBLICATIONS

Kirillov Alexander et al., "Segment Anything", 2023, arXiv:2304. 02643v1 [cs.CV].

(Continued)

*Primary Examiner* — Tom Y Lu
(74) *Attorney, Agent, or Firm* — The PL Law Group, PLLC

(57) ABSTRACT

A knowledge distillation method for compressing an image segmentation model that is performed in a computing device including one or more processors and a memory storing one or more programs executed by the one or more processors includes training a first image segmentation model including a first image encoder, a first image embedding layer, and a first mask decoder, constructing a second image segmentation model including a second image encoder, a second image embedding layer, and a second mask decoder according to preset constraints, and performing knowledge distillation for the second image embedding layer of the second image segmentation model based on the trained first image segmentation model.

7 Claims, 5 Drawing Sheets

200

(51) Int. Cl.
    *G06V 10/776*      (2022.01)
    *G06V 10/26*       (2022.01)

(56)            References Cited

OTHER PUBLICATIONS

Office action issued on Mar. 27, 2026 from Korean Patent Office in a counterpart Korean Patent Application No. 10-2023-0145114 (all the cited references are listed in this IDS.) (English translation is also submitted herewith.).

Chaoning Zhang et al., "Faster Segment Anything: Towards Light-weight SAM for Mobile Applications", arXiv preprint arXiv: 2306.14289, Jun. 25, 2023, DOI:10.48550/arXiv.2306.14289 (see the whole document.).

Qing Xu et al., "SPPNet: A Single-Point Prompt Network for Nuclei Image Segmentation", arXiv preprint arXiv:2308.12231, Aug. 23, 2023, DOI:10.48550/arXiv.2308.12231 (see the whole document.).

* cited by examiner

Figure 5:
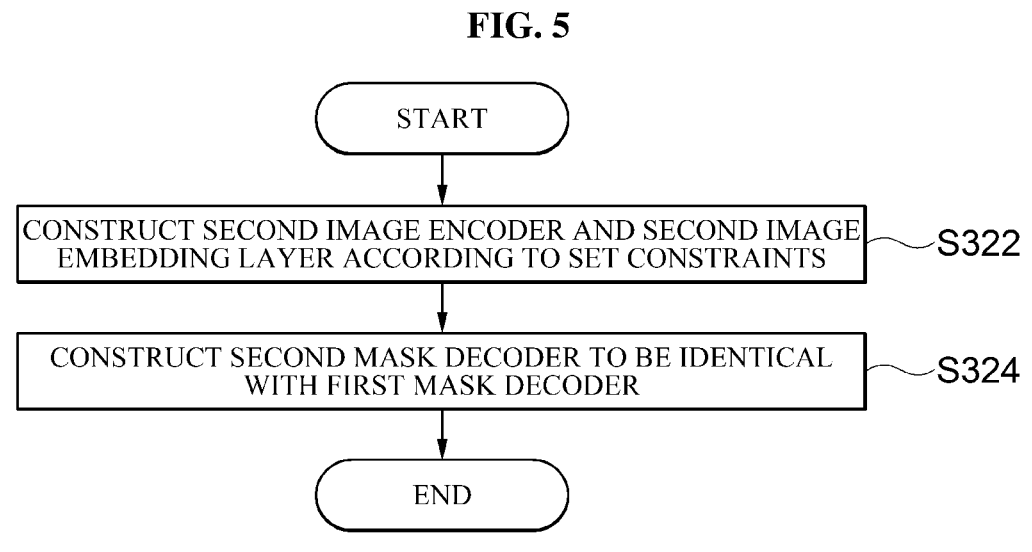

```
        ┌──────────────┐
        │    START     │
        └──────┬───────┘
               │
               ▼
┌─────────────────────────────────────────────────┐
│ CONSTRUCT SECOND IMAGE ENCODER AND SECOND IMAGE  │──── S322
│ EMBEDDING LAYER ACCORDING TO SET CONSTRAINTS     │
└─────────────────────┬───────────────────────────┘
                      │
                      ▼
┌─────────────────────────────────────────────────┐
│ CONSTRUCT SECOND MASK DECODER TO BE IDENTICAL    │──── S324
│ WITH FIRST MASK DECODER                          │
└─────────────────────┬───────────────────────────┘
                      │
                      ▼
              ┌──────────────┐
              │     END      │
              └──────────────┘
```

1

KNOWLEDGE DISTILLATION METHOD FOR COMPRESSING IMAGE SEGMENTATION MODEL AND COMPUTING DEVICE FOR PERFORMING THE SAME

CROSS-REFERENCE TO RELATED APPLICATION AND CLAIM OF PRIORITY

This application claims the benefit under 35 USC § 119 of Korean Patent Application No. 10-2023-0145114, filed on Oct. 26, 2023, in the Korean Intellectual Property Office, the entire disclosure of which is incorporated herein by reference for all purposes.

BACKGROUND

1. Field

Embodiments of the present disclosure relate to a knowledge distillation method for compressing an image segmentation model and a computing device for performing the same.

2. Description of Related Art

ChatGPT has revolutionized the field of Natural Language Processing (NLP) and provided a breakthrough in generative AI (aka, artificial intelligence generated content (AIGC)). What makes this possible is a GPT series model, which is a base model trained on web-scale text data sets. Following the success of the base model in NLP, in several tasks, image encoders have been trained along with text encoders through contrastive learning.

A segment anything model (SAM) has recently appeared in the field of image segmentation. The SAM is based on rapid guided vision and is called GPT for vision. The SAM includes two components: a vision transformer (ViT)-based image encoder and a prompt-guided mask decoder that operate in sequence.

The SAM has attracted considerable attention since its emergence for several reasons. First, the SAM shows that vision is able to pursue a path that combines the base model and rapid engineering along NLP for the first time. Second, the SAM performs label-free segmentation that is a basic vision task in parallel with label prediction for the first time. In addition, through this basic task, the SAM may be allowed to be compatible with other models, which enables the SAM to run advanced vision applications such as text-based segmentation and image editing with fine-tuning control.

However, many of these use cases require running on devices with limited resources, such as mobile apps, but the existing SAM is very heavy because the image encoder is based on the ViT-Huge model with more than 600,000,000 parameters, and thus has a problem of difficult compatibility with mobile devices.

Examples of the related art include Alexander Kirillov, Eric Mintun, Nikhila Ravi, Hanzi Mao, Chloe Rolland, Laura Gustafson, Tete Xiao, Spencer Whitehead, Alexander C Berg, Wan-Yen Lo, et al. Segment anything. arXiv preprint arXiv: 2304.02643, 2023.

SUMMARY

Embodiments of the present disclosure is intended to provide a knowledge distillation method for compressing an image segmentation model and a device for performing the same.

2

In one general aspect, there is provided a knowledge distillation method for compressing an image segmentation model that is performed in a computing device including one or more processors and a memory storing one or more programs executed by the one or more processors, the knowledge distillation method including training a first image segmentation model including a first image encoder, a first image embedding layer, and a first mask decoder, constructing a second image segmentation model including a second image encoder, a second image embedding layer, and a second mask decoder according to preset constraints, and performing knowledge distillation for the second image embedding layer of the second image segmentation model based on the trained first image segmentation model.

The second image segmentation model may be a lighter model than the first image segmentation model.

The first mask decoder may further include a prompt encoder configured to receive at least one of a dot, a box, and text and output a prompt embedding vector, the first image embedding layer may output an image embedding vector based on a value output from the first image encoder by using a training image as input, and the first mask decoder may generate a mask for segmenting an image based on the output image embedding vector and the output prompt embedding vector.

The constructing of the second image segmentation model may further include constructing the second image encoder and the second image embedding layer according to the preset constraints and constructing the second mask decoder to be identical to the first mask decoder of the trained first image segmentation model by copying the first mask decoder.

The performing of the knowledge distillation may further include outputting a first image embedding vector using the first image embedding layer based on a value output from the first image encoder, by using training data as input, outputting a second image embedding vector using the second image embedding layer based on a value output from the second image encoder, by using the training data as input, and training the second image embedding layer so that a distance between the first image embedding vector and the second image embedding vector is minimized.

In another general aspect, there is provided a computing device including one or more processors, a memory, and one or more programs, in which the one or more programs are configured to be stored in the memory and executed by the one or more processors, and the one or more programs include instructions for training a first image segmentation model including a first image encoder, a first image embedding layer, and a first mask decoder, instructions for constructing a second image segmentation model including a second image encoder, a second image embedding layer, and a second mask decoder according to preset constraints, and instructions for performing knowledge distillation for the second image embedding layer of the second image segmentation model based on the trained first image segmentation model.

In still another general aspect, there is provided a computing device including one or more processors, a memory, and one or more programs, in which the one or more programs are configured to be stored in the memory and executed by the one or more processors, and the one or more programs include instructions for training a first image segmentation model including a first image encoder and a first mask decoder, instructions for constructing a second image segmentation model including a second image encoder and a second mask decoder according to preset constraints, and instructions for performing knowledge distillation for the second image encoder of the second image segmentation model based on the trained first image segmentation model.

BRIEF DESCRIPTION OF THE DRAWINGS

FIG. 5 is a flowchart for describing step 320 in detail according to one embodiment of the present disclosure.

DETAILED DESCRIPTION

Figure 1:
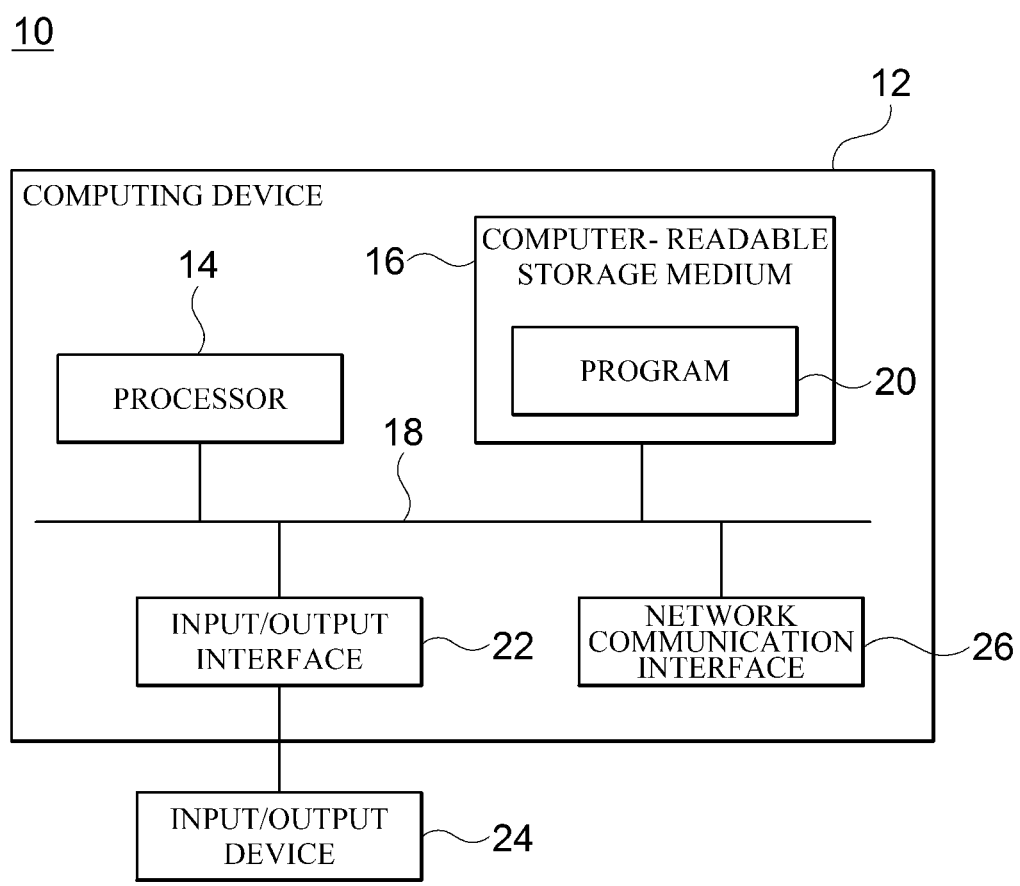
FIG. 1 is a block diagram exemplarily illustrating a computing environment that includes a computing device suitable for use in exemplary embodiments.

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice, the intention of a user or operator, or the like. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

In the following description, the terminology "transmission", "communication", "reception" of a signal or information and terminology similar thereto may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same is true for "reception" of the signal or information. In addition, in the present specification, a meaning in which two or more pieces of data or information are "related" indicates that when any one piece of data (or information) is obtained, at least a portion of other data (or information) may be obtained based thereon.

Meanwhile, the embodiments of the present disclosure may include a program for performing the methods described herein on a computer, and a computer-readable recording medium including the program. The computer-readable recording medium may include program instructions, a local data file, a local data structure, or the like alone or in combination. The media may be specially designed and configured for the present disclosure, or may be commonly used in the field of computer software. Examples of computer-readable recording media include magnetic media such as hard disks, floppy disks and magnetic tapes, optical recording media such as a CD-ROM and a DVD, and hardware devices specially configured to store and execute program instructions such as a ROM, a RAM, and a flash memory. Examples of the program may include not only machine language codes such as those produced by a compiler, but also high-level language codes that can be executed by a computer using an interpreter or the like.

FIG. 1 is a block diagram exemplarily illustrating a computing environment 10 that includes a computing device suitable for use in exemplary embodiments. In the illustrated embodiments, each component may have different functions and capabilities in addition to those described below, and additional components may be included in addition to those described below.

The illustrated computing environment 10 includes a computing device 12. In one example, the computing device 12 may be a device for performing knowledge distillation for compressing an image segmentation model according to an embodiment of the present disclosure.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In one embodiment, the computer-readable storage medium 16 may be a memory (a volatile memory such as a random access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as one of components constituting the computing device 12, or may be connected to the computing device 12 as a separate device distinct from the computing device 12.

Figure 2:
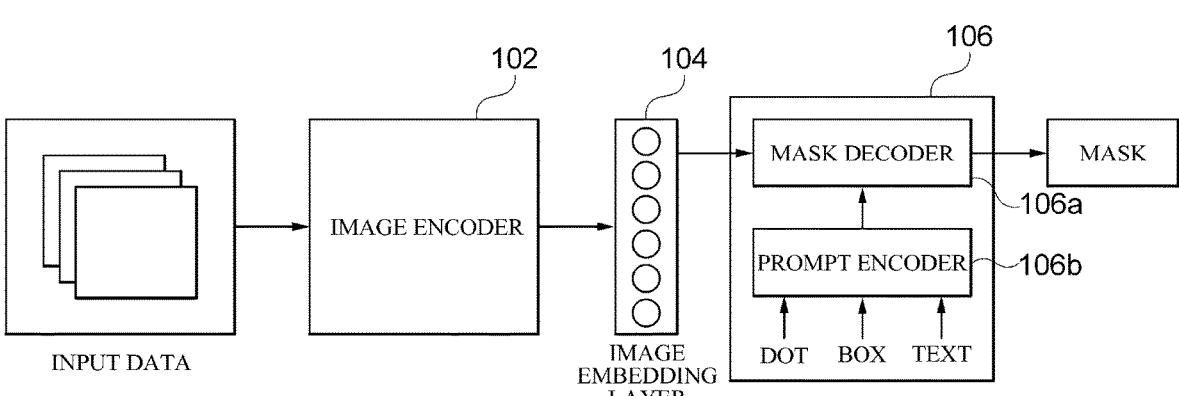
FIG. 2 is a block diagram illustrating an existing segment anything model (SAM).

FIG. 2 is a block diagram illustrating an existing segment anything model (SAM).

As illustrated in FIG. 2, an existing SAM 100 includes a vision transformer (ViT)-based image encoder 102, an image embedding layer 104 and a prompt-guided mask decoder 106. The prompt-guided mask decoder 106 may be constituted by a mask decoder 106*a* and a prompt encoder 106*b*. The image encoder 102 may receive an input image, downscale the size of the input image from the input image, and output an image embedding vector through the image embedding layer 104. The prompt-guided mask decoder 106 may be constituted by the prompt encoder 106*b* for mapping and outputting a prompt such as a dot, a box, and text into a 256-dimensional prompt embedding vector and the mask decoder 106*a* for generating a mask that cuts out objects in the image based on the image embedding vector and the prompt embedding vector. In this case, while the prompt-guided mask decoder 106 is lightweight (the mask decoder 106*a* and prompt encoder 106*b* use 3.87 million and 6,000 parameters, respectively), the ViT-Huge based image encoder 102 and the image embedding layer 104 use 632 million parameters for learning, and thus the image encoder 102 and the image embedding layer 104 are very heavy, making the existing SAM 100 unsuitable for use on mobile devices. Accordingly, new learning using ViT-Base (using 86 million parameters) or ViT-Large (using 307 million parameters), as the image encoder 102, and the image embedding layer 104 requires a lot of cost and time.

That is, the present disclosure may perform knowledge distillation to train a lightweight SAM consisting of the ViT-based image encoder and a lightweight image embedding layer by distilling knowledge of the image encoder and a heavy image embedding layer of the existing SAM, thereby reducing the cost and time used to make the model lightweight.

Meanwhile, encoder-decoder models are known to affect each other's performance during a learning process. The optimization of the encoder depends on the performance of the decoder, and vice versa. That is, it may be difficult to train the image embedding layer in a good state in a state in which the performance of both the encoder and decoder is bad.

Therefore, in the present disclosure, since the mask decoder of the existing SAM is already lightweight, performance may be maintained by copying the mask decoder of the existing SAM without separately training the mask decoder of the lightweight SAM in spite of compressing the model.

Figure 3:
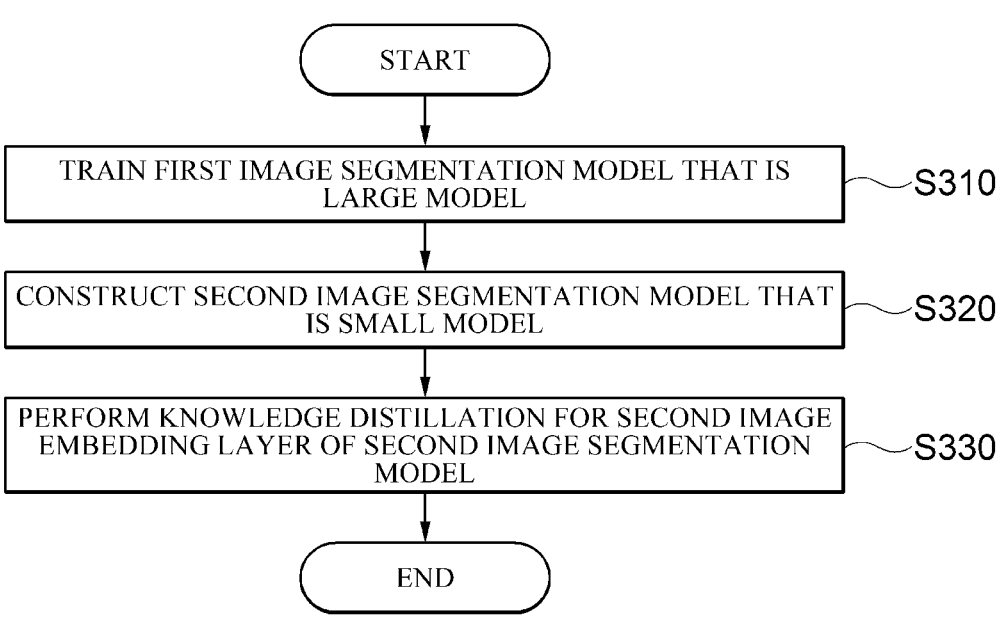
FIG. 3 is a flowchart for describing a knowledge distillation method for compressing an image segmentation model according to one embodiment of the present disclosure.

FIG. 3 is a flowchart for describing a knowledge distillation method for compressing an image segmentation model according to one embodiment of the present disclosure. As described above, the knowledge distillation method for compressing an image segmentation model according to an embodiment of the present disclosure may be performed by a computing device 12 including one or more processors, and a memory storing one or more programs executed by the one or more processors. To this end, the knowledge distillation method for compressing an image segmentation model may be implemented in the form of a program or software including one or more computer-executable instructions and stored in the memory.

Further, in the illustrated flowchart, the method is divided into a plurality of steps; however, at least some of the steps may be performed in a different order, performed together in combination with other steps, omitted, performed in subdivided steps, or performed by adding one or more steps not shown.

In step 310, the computing device 12 trains a first image segmentation model 210, which is a large (heavy) model. Specifically, a first image encoder 212, a first image embedding module 214, and a first mask decoder 216 of the first image segmentation model 210 may be trained using a loss function for training data.

Figure 4:
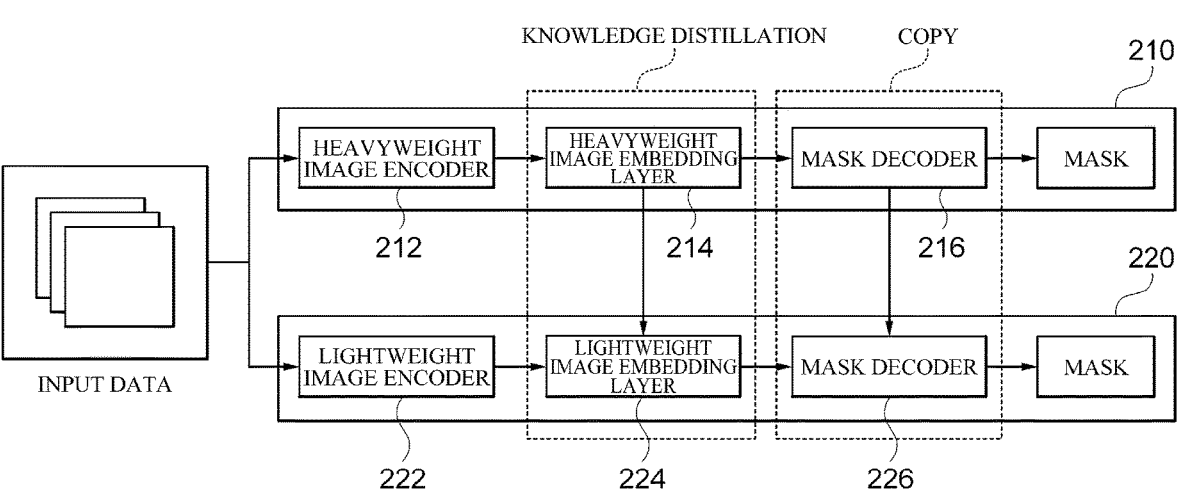
FIG. 4 is a configuration diagram for describing a device for performing knowledge distillation for compressing an image segmentation model according to one embodiment of the present disclosure.

FIG. 4 is a configuration diagram for describing a device for performing knowledge distillation for compressing an image segmentation model according to one embodiment of the present disclosure.

Referring to FIG. 4, a device 200 for performing knowledge distillation for compressing an image segmentation model may include a first image segmentation model 210 and a second image segmentation model 220. The first image segmentation model 210 may be a heavyweight (teacher) model (existing SAM), and the second image segmentation model 220 may be a lightweight (student) model (lightweight SAM). That is, the device 200 for performing knowledge distillation for compressing an image segmentation model may be the computing device 12 for transferring knowledge of the first image segmentation model 210 that has completed learning to the second image segmentation model 220. In this case, the device 200 for performing knowledge distillation for compressing an image segmentation model transfers (performs knowledge distillation) the knowledge of the first image embedding layer 214 of the first image segmentation model 210 to the second image embedding layer 224 of the second image segmentation model 220, where the mask decoder 216 of the first image segmentation model 210 may be directly transferred (copied) to the mask decoder 226 of the second image segmentation model 220. A specific method for this will be described in detail below.

The first image segmentation model 210 may include the first image encoder 212, the first image embedding layer, and the first mask decoder 216. The first image encoder 212 may be constituted by a ViT-Huge based image encoder, and the first mask decoder 216 may be constituted by a mask decoder (not illustrated) and a prompt encoder (not illustrated).

Here, the first image embedding layer 214 may output the image embedding vector based on a value output from the first image encoder 212 by using training data as input. The first mask decoder 216 may generate a mask that cuts out an object from the image based on the image embedding vector of the first image embedding layer 214 and the prompt embedding vector of the prompt encoder. In this case, the computing device 12 may train the first image segmentation model 210 so that the difference between the mask generated by the first mask decoder 216 and a correct mask is minimized. When training of the first image segmentation model 210 has been completed, parameters of the first image encoder 212 and parameters of the first mask decoder 216 may be fixed.

In addition, the second image segmentation model 220 may include a second image encoder 222, a second image embedding layer 224, and a second mask decoder 226. The second image encoder 222 may be constituted by a ViT-based image encoder, and the second mask decoder 226 may be constituted by a mask decoder (not illustrated) and a prompt encoder (not illustrated). Here, the second image embedding layer 224 may be trained by performing knowledge distillation based on the first image embedding layer 214 of the first image segmentation model 210, and the second mask decoder 226 may be identical to the first mask decoder 216 of the first image segmentation model 210 by doing copying. That is, the computing device 12 may perform transfer (knowledge distillation) to minimize the difference between results of the first image embedding layer 214 and results of the second image embedding layer 224, thereby inducing the difference between the mask generated in the first mask decoder 216 and the mask generated in the second mask decoder 226 to be minimized and thus training the second image segmentation model 220.

Referring back to FIG. 3, in step 320, the computing device 12 constructs the second image segmentation model 220 that is a small model.

In an exemplary embodiment, as illustrated in FIG. 5, in step 322, the computing device 12 may construct the second image encoder 222 and the second image embedding layer 224 of the second image segmentation model 220 according to preset constraints. Specifically, the computing device 12 may compress the second image encoder 222 and the second image embedding layer 224 to construct the second image segmentation model 220, which is a small model, according to the constraints (e.g., memory usage or the like) of a target system to which the second image segmentation model 220 and the second image embedding layer 224 are to be applied. That is, the second image segmentation model 220 may be lighter than the first image segmentation model 210. Here, the lightweight model may mean that at least one of the number of layers, the number of channels, the number of parameters, the calculation amount, the resource usage, and a power usage, which constitute the second image segmentation model 220, is smaller than that of the first image segmentation model 210. Accordingly, in the present disclosure, the first image encoder 212 and the first image embedding layer 214 of the first image segmentation model 210 may be configured based on ViT-Huge, whereas the second image encoder 222 and the second image embedding layer 224 of the second image segmentation model 220 may be configured based on ViT-Base to be lightweight. Here, the first image encoder 212 based on ViT-Huge uses 632 million parameters, and the second image encoder 222 based on ViT-Base uses 86 million parameters.

In addition, in step 324, the computing device 12 may copy the first mask decoder 216 of the first image segmentation model 210 that has completed learning and construct the second mask of the second image segmentation model 220 to be identical to the first mask decoder 216. That is, rather than training the second mask decoder 226 of the second image segmentation model 220 separately, the second mask decoder 226 of the second image segmentation model 220 may be constructed by transferring the trained first mask decoder 216 in the first image segmentation model 210 as it is. This is because the first mask decoder 216 of the first image segmentation model 210 is formed in a lightweight structure, so copying the same structure on the second mask decoder 226 saves time and cost, and thus it is possible to prevent the performance of the second image segmentation model 220 from deteriorating depending on the performance of the second image encoder 222 and the second image embedding layer 224.

Meanwhile, in the present disclosure, it has been described that the second mask decoder 226 of the second image segmentation model 220 is used by transferring the first mask decoder 216 of the first image segmentation model 210 as it is, but by fine-tuning the second mask decoder 226, the performance of the second mask decoder 226 may be prevented from deteriorating depending on the performance of the second image encoder 222 and the second image embedding layer 224.

In step 330, the computing device 12 performs knowledge distillation on the second image embedding layer 224 of the second image segmentation model 220. Specifically, the computing device 12 may output a first image embedding vector by inputting, into the first image embedding layer 214, a value output by inputting training data into the first image encoder 212 of the first image segmentation model 210 and output a second image embedding vector by inputting, into the second image embedding layer 224, a value output by inputting training data into the second image encoder 222 of the second image segmentation model 220. The computing device 12 may train the second image embedding layer 224 to minimize the difference between the first image embedding vector and the second image embedding vector.

According to embodiments of the present disclosure, a segment anything model (SAM) can be compressed to be suitable for mobile devices with limited resources.

In addition, according to embodiments of the present disclosure, by performing knowledge distillation for distilling knowledge of an image embedding layer of a large model (existing (heavyweight) SAM) to train an image embedding layer of a small model (lightweight SAM) and by copying a mask decoder of the large (heavyweight) model to a mask decoder of the small (lightweight) model, performance can be maintained in spite of compressing the model.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A knowledge distillation method for compressing an image segmentation model that is performed in a computing device including one or more processors and a memory storing one or more programs executed by the one or more processors, the knowledge distillation method comprising:

training a first image segmentation model including a first image encoder, a first image embedding layer, and a first mask decoder;

constructing a second image segmentation model including a second image encoder, a second image embedding layer, and a second mask decoder according to preset constraints; and performing knowledge distillation for the second image embedding layer of the second image segmentation model based on the trained first image segmentation model, wherein the performing of the knowledge distillation further includes:

outputting a first image embedding vector using the first image embedding layer based on a value output from the first image encoder, by using training data as input;

outputting a second image embedding vector using the second image embedding layer based on a value output from the second image encoder, by using the training data as input; and training the second image embedding layer so that a distance between the first image embedding vector and the second image embedding vector is minimized.

2. The knowledge distillation method of claim 1, wherein the second image segmentation model is a lighter model than the first image segmentation model.

3. The knowledge distillation method of claim 1, wherein the first mask decoder includes a prompt encoder configured to receive at least one of a dot, a box, and text and output a prompt embedding vector, the first image embedding layer outputs an image embedding vector based on a value output from the first image encoder by using a training image as input, and the first mask decoder generates a mask for segmenting an image based on the output image embedding vector and the output prompt embedding vector.

4. The knowledge distillation method of claim 1, wherein the constructing of the second image segmentation model further includes:

constructing the second image encoder and the second image embedding layer according to the preset constraints; and constructing the second mask decoder to be identical to the first mask decoder of the trained first image segmentation model by copying the first mask decoder.

5. A computing device comprising:

one or more processors;

a memory; and one or more programs, wherein the one or more programs are configured to be stored in the memory and executed by the one or more processors, and the one or more programs include:

instructions for training a first image segmentation model including a first image encoder, a first image embedding layer, and a first mask decoder;

instructions for constructing a second image segmentation model including a second image encoder, a second image embedding layer, and a second mask decoder according to preset constraints; and instructions for performing knowledge distillation for the second image embedding layer of the second image segmentation model based on the trained first image segmentation model, wherein the instructions for performing knowledge distillation include:

instructions for outputting a first image embedding vector using the first image embedding layer based on a value output from the first image encoder, by using training data as input;

instructions for outputting a second image embedding vector using the second image embedding layer based on a value output from the second image encoder, by using the training data as input; and instructions for training the second image embedding layer so that a distance between the first image embedding vector and the second image embedding vector is minimized.

6. The computing device of claim 5, wherein the second image segmentation model is a lighter model than the first image segmentation model.

7. The computing device of claim 5, wherein the instructions for constructing a second image segmentation model include:

instructions for constructing the second image encoder and the second image embedding layer according to the preset constraints; and instructions for constructing the second mask decoder to be identical to the first mask decoder of the trained first image segmentation model by copying the first mask decoder.

* * * * *